United States Patent [19]

Hauck

[11] Patent Number: 4,983,114
[45] Date of Patent: Jan. 8, 1991

[54] INLET FOR TWIN SCREW EXTRUDER

[75] Inventor: Bobbie W. Hauck, Sabetha, Kans.

[73] Assignee: Wenger Manufacturing, Inc., Sabetha, Kans.

[21] Appl. No.: 565,901

[22] Filed: Aug. 10, 1990

Related U.S. Application Data

[63] Continuation of Ser. No. 386,570, Jul. 27, 1989, abandoned.

[51] Int. Cl.$^5$ .......................... B29B 7/48; B29B 7/60; B29B 7/84
[52] U.S. Cl. ........................ 425/203; 366/75; 366/76; 366/85; 366/90; 366/328; 425/205; 425/208
[58] Field of Search ............... 425/203, 204, 205, 207, 425/208, 200; 366/76, 83, 85, 90, 338, 339, 88, 324, 328, 75

[56] References Cited

U.S. PATENT DOCUMENTS

| | | | |
|---|---|---|---|
| 2,765,491 | 10/1956 | Magerkurth | 366/90 |
| 3,334,163 | 8/1967 | Gilbert | 425/200 |
| 4,632,795 | 12/1986 | Huber et al. | 366/90 |
| 4,652,138 | 3/1987 | Inoue et al. | 366/90 |

FOREIGN PATENT DOCUMENTS

| | | | |
|---|---|---|---|
| 0068561 | 1/1983 | European Pat. Off. | 425/203 |
| 2726962 | 1/1979 | Fed. Rep. of Germany | 425/204 |
| 44-32553 | 12/1969 | Japan | 425/204 |
| 549135 | 5/1977 | U.S.S.R. | 425/203 |

Primary Examiner—Jay H. Woo
Assistant Examiner—Khanh P. Nguyen
Attorney, Agent, or Firm—Hovey, Williams, Timmons and Collins

[57] ABSTRACT

In an extruder for processing material to form an extruded product, the extruder including an elongated extruder barrel having a material inlet end and an outlet end remote from the inlet end, and a pair of elongated, axially co-rotatable, flighted extrusion screws within the barrel for moving materials from the inlet end towards and through the outlet end, the barrel is provided with a pair of parallel bores which are formed with spiral grooved surfaces along at least a portion of their lengths. An inlet opening is provided adjacent the inlet end of the barrel such that one of the co-rotating screws of the extruder rotates in a direction outward and downward from the inlet opening and the other screw rotates upward and toward the inlet opening. The bore receiving the upturning screw is provided with a smooth surface region adjacent the opening which prevents material entering the inlet opening from being delivered back into the opening by the upturning screw.

7 Claims, 2 Drawing Sheets

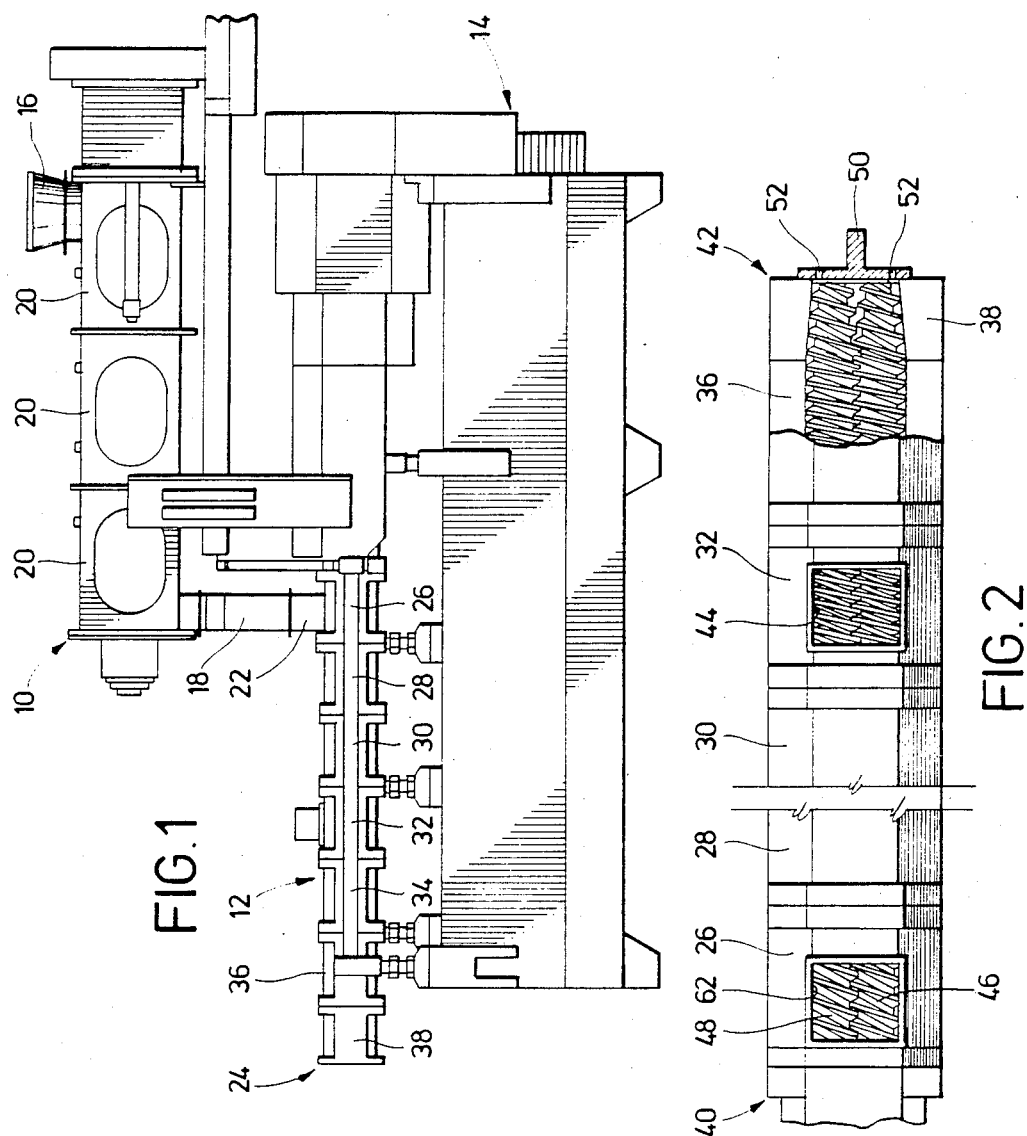

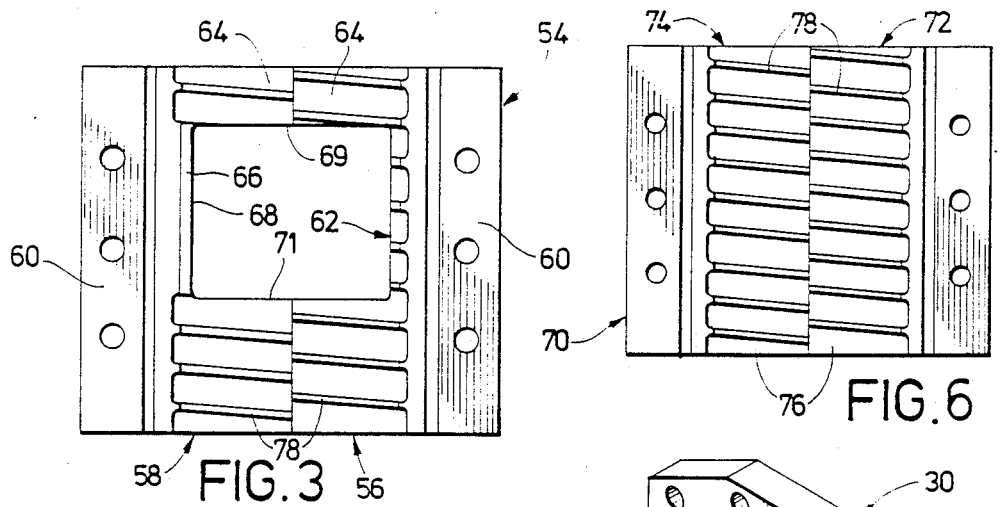
FIG.3
FIG.6
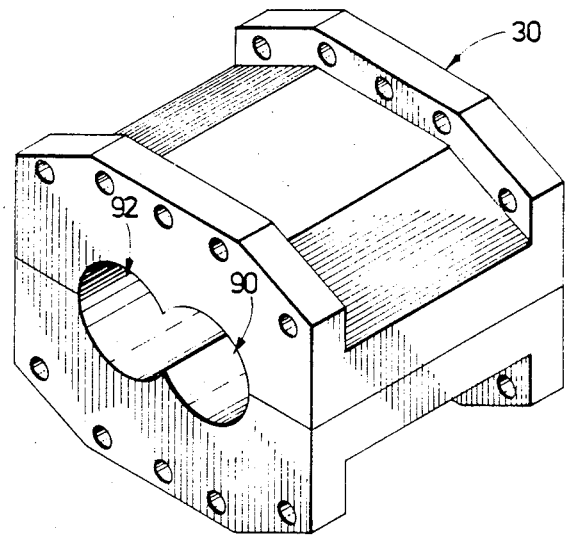
FIG.4
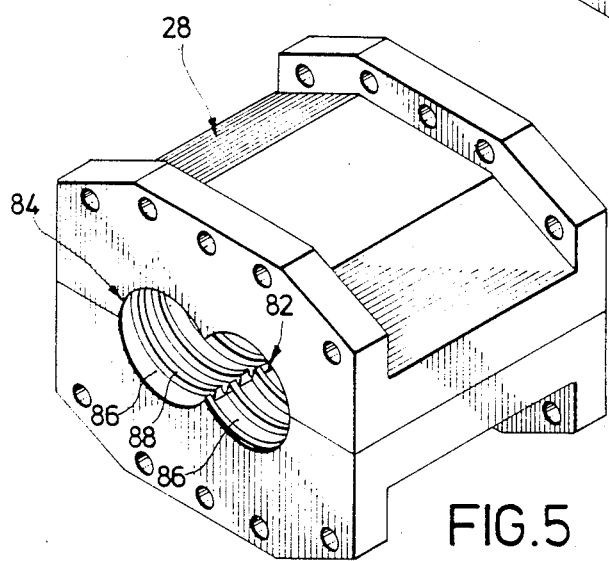
FIG.5

INLET FOR TWIN SCREW EXTRUDER

This application is a continuation of application Ser. No. 07/386,570, filed July 27, 1989, now abandoned.

BACKGROUND OF THE INVENTION

1. Field of the Invention

The present invention relates generally to extruders and, more particularly, to a twin-screw extruder having an inlet head section provided with an internally grooved surface.

2. Description of the Prior Art

Both single screw and twin screw corotating intermeshing extrusion mechanisms are used in the food processing industry and convey material from an inlet to a die by virtue of having the material slip on the surface of the screw or screws. However, in single screw mechanisms, the head or barrel wall of the extruder can produce insufficient resistance to prevent the extrudate from spinning at the barrel wall and thus material will stick on the screw surface and not be conveyed forward.

In order to prevent the extrudate from sticking to the single screw and spinning at the head wall, the inside bore of the single screw extruder head is often grooved with helical grooves which are configured to propel the extrudate toward the die. These grooves act to increase the friction between the wall and the extrudate so as to prevent the extrudate from spinning at the head wall, and thus tend to provide a cleaning of the single screw. Further, because the helical grooves serve as an extension of the screw helix, the capability of the mechanism to propel the extrudate toward the die increases, thus providing an increase in the capacity of the single screw mechanism.

In co-rotating twin screw mechanisms with fully intermeshing screws, there is an interaction of one screw flight with the flow channel in the adjoining screw. Thus, if any extrudate sticks to the screw surfaces, the adjacent screw crest wipes the material from the companion screw flank as the two screws intermesh and the adjacent screw thus transports the extrudate forward. Because of this interaction between the screws, it has not in the past been thought necessary to provide anti-rotational mechanisms in the barrel walls in order to achieve a self-cleaning construction.

SUMMARY OF THE INVENTION

It is an object of the present invention to provide a twin screw extruder having co-rotating intermeshing screws, wherein the extruder has an increased capacity as compared with known twin screw extruder mechanisms.

Such a construction has been achieved by the present invention in that an extruder is provided which includes a barrel having a pair of parallel bores extending axially therealong, the bores being in communication with one another and being provided with spiral grooved surfaces along at least a portion of their lengths extending a predetermined distance from the inlet end of the barrel towards the outlet end. By employing this construction, the present inventor has achieved an increase in capacity of over 20% compared to equivalent twin screw extruders provided with barrels having completely smooth bores.

The extruder of the invention preferably includes an inlet opening adjacent the inlet end of the barrel which is oriented relative to the screws such that one of the co-rotating screws rotates in a direction outward and downward from the inlet opening and the other screw rotates upward and toward the inlet opening. The bore receiving the upward turning screw is provided with a smooth surface region extending in the circumferential direction of the bore from an axial line level with the central longitudinal axes of the bores to the inlet opening, and extending axially along the length of the inlet opening, the region preventing material from being turned back into the inlet opening through the grooves once it has been received into the flow channels of the screws.

BRIEF DESCRIPTION OF THE DRAWINGS

A preferred embodiment of the invention is described in detail below with reference to the attached drawing figures, wherein:

FIG. 1 is a side elevation view of an extruder assembly constructed in accordance with the invention;

FIG. 2 is a partial plan view of the extruder, partially cut away, which illustrates the inlet and vent openings of the extruder;

FIG. 3 is a plan view of the upper inlet head section member of the extruder;

FIG. 4 is a perspective view of a head section of the extruder having smooth surfaced bores extending therethrough;

FIG. 5 is a perspective view of a head section of the extruder having bores formed with spiral grooved surfaces; and FIG. 6 is a plan view of the lower inlet head section member of the extruder which mates with the upper head inlet head section member of FIG. 3 to form the inlet head section.

DESCRIPTION OF THE PREFERRED EMBODIMENT

An extruder assembly constructed in accordance with the invention is illustrated in FIG. 1, and includes a preconditioning mechanism 10 and an extruder mechanism 12 mounted together on a single frame structure 14.

The preconditioning mechanism 10 operates to mix certain predetermined materials together prior to their being passed into the extruder mechanism 12, and includes an inlet hopper 16, an outlet or discharge orifice 18 remote from the inlet hopper, and a plurality of mixing and conditioning chambers 20 intermediate the inlet hopper and outlet orifice.

The outlet orifice 18 of the preconditioning mechanism 10 opens immediately above an inlet hopper 22 of the extruder mechanism 12 so that preconditioned material leaving the mechanism 10 travels directly into the extruder 12 for processing. The extruder mechanism 12 includes a barrel 24 formed of a plurality of barrel or head sections connected end-to-end along the length of the extruder between an inlet end 40 of the extruder and an outlet end 42. As discussed below, and as illustrated in FIGS. 3-6, each of these head sections, in turn, are preferably constructed of upper and lower head section members which are secured together along a horizontal plane in a conventional manner to define each section.

The inlet end 40 of the extruder is provided with an inlet head section 26 having an inlet opening 62, shown in FIG. 3, exposed to the hopper 22 so that material leaving the preconditioning mechanism 10 enters the extruder. Downstream of the inlet head section 26 in the direction toward the outlet end 42 of the extruder, the plurality of intermediate head sections are provided which separate the inlet head section 26 from the outlet or cone screw head section 38. At least one of these intermediate head sections 32 may include a vent opening 44 through which material may be added or removed from the extrudate in order to increase the utility of the extruder mechanism in processing the extrudate in a desired fashion.

Turning to FIG. 2, the extruder mechanism 12 is shown as including a pair of co-rotating intermeshing extruder screws 46, 48 extending along the length of the barrel 24 between the inlet and outlet ends thereof. As viewed through the inlet and vent openings 22, 44, both of the screws 46, 48 rotate in the downward direction of the figure such that material dispensed into the openings 22, 44 is transported toward the outlet end of the extruder. Thus, the right-hand or lower screw 46, as shown in FIG. 2, rotates in a direction downward and away from the inlet and vent openings 22, 44 while the left-hand or upper screw 48 rotates in a direction upward and towards the openings. Because of this relationship between each of the screws and the openings, the right-hand screw 46 is referred to as the down-turning screw and the left-hand screw 48 is called the up-turning screw.

Although the inlet and vent openings 22, 44 are illustrated in the figures as being of square cross-sectional shape, it is understood that any desired shape may be employed without departing from the scope of the invention. A die plate 50 is disposed at the outlet end of the extruder mechanism and includes a plurality of die orifices 52 through which the extrudate flows after having completed its travel through the mechanism.

An upper member 54 of the inlet head section is shown in FIG. 3, and includes a pair of generally centrally disposed longitudinally extending parallel semi-cylindrical bore sections 56, 58 which are in communication with one another and which intersect one another along a central line of intersection. A pair of flat mounting surfaces 60 are provided on the section member 54 at a position laterally outward of the bore sections 56, 58 and include holes by which the upper section member can be attached to the lower section member.

The inlet opening 62 extends through the upper section member 54 in a direction perpendicular to the direction in which the bore sections 56, 58 extend, and intersects the bore sections in a symmetrical manner such that an equal area of each of the bores of the head is exposed to the opening. Each of the bore sections 56, 58 are provided with a spiral grooved surface 64 along the length thereof, and include at least one continuous helical groove configured to propel material in the barrel in a direction towards the outlet end 42 of the extruder.

Preferably, the grooved surface 64 includes a double flight helix configuration including two side-by-side helical grooves extending along a continuous path through the section. However, depending upon the amount of lead desired for a given application, the helical configuration could include any desired number of continuous flights.

In one preferred construction of the invention, the flight pitch of the grooved surfaces is 2.70 inches, and the flight depth, flight land and root radius of the flight are all 0.188 inches. However, it is not necessary to employ these exact dimensions so long as the grooved surfaces are constructed to provide sufficient transportation of the extrudate through the grooves without permitting sticking of material to the barrel surface. Such transportation will not occur if the grooves are constructed too deep since the movement of the extrudate through the grooves is carried out solely by frictional forces acting on the extrudate by the material flowing along the flow channels of the screws, and material resting in a deep groove would not be sufficiently subjected to such frictional forces. Likewise, if the groove is too shallow, material is not reliably transported forward toward the outlet end of the extruder and tends to stick to the surface of the barrel.

In the upper inlet head section member 54, one region 66 of the surface which is exposed to the screw 48 is not provided with grooves. This region 66 extends in the circumferential direction of the left-hand bore between the edge of the bore which is coplaner with the mounting surfaces 60 and the left-hand edge 68 of the inlet opening 62. The region extends in the axial or longitudinal direction of the head section member 54 between the upstream and downstream edges 69, 71 of the inlet opening 62.

By providing the upper inlet head section member with this smooth surface region 66, material is prevented from being propelled back out of the inlet opening 62 once it has been pulled into the flow channel of the left-hand screw 48 of the extruder.

A lower member 70 of the inlet head section is shown in FIG. 6. As illustrated, the lower member 70 also includes a pair of generally centrally disposed longitudinally extending parallel semi-cylindrical bore sections 72, 74 which are in communication with one another and which intersect one another along a central line of intersection. A second pair of flat mounting surfaces 76 are provided on the lower member for attachment to the mounting surfaces 60 of the upper section member 54.

Each of the bore sections 72, 74 of the lower member 70 include a grooved surface along the entire length thereof which remains uninterrupted even in the region adjacent the inlet opening 62. A rib 78 is formed between each flight of the spiral grooved surfaces 64, of the bore sections 56, 58, 72, 74 of both the upper and lower inlet head section members 54, 70, and is formed so that each rib of one of the bores is aligned with a groove of the other bore along the line of intersection between the two bores. By providing this arrangement, mixing of the extrudate is expedited.

Immediately downstream of the inlet head section 26, an intermediate head section 28 is provided which is illustrated in FIG. 5, and which includes a pair of generally centrally disposed longitudinally extending parallel bores 82, 84 which are in communication with one another and which intersect one another along upper and lower intersecting edges. Each of these bores are provided with a spiral grooved surface 86 defining at least one continuous helical groove configured to propel material in the barrel in a direction towards the outlet end 42. In addition, a rib 88 is formed between each flight of the spiral grooved surfaces 86 of the bores which is aligned with a groove of the other bore along the edge of intersection between the two bores.

In the preferred embodiment, only the first intermediate head section 28 downstream of the inlet section 26 is provided with bores having grooved surfaces, and the next intermediate head section 30 includes bores 90, 92 having smooth surfaces such as illustrated in FIG. 4.

However, the exact longitudinal distance covered by the spiral grooved surfaces of the bores along the length of the barrel need not equal two head sections, but rather can be provided downstream of the inlet opening 62 by any desired distance which results in improved capacity of the extruder mechanism 12. Preferably, this distance will be at least as great as the diameter or one of the bores 56, 58. However, a larger or smaller distance may be appropriate for certain processes.

If a vent head section 32 is employed in the mechanism, as illustrated in FIG. 1, the vent head section and the first intermediate section 34 downstream of the vent section may also be provided with bores having spiral grooved surfaces so that an increased capacity of material may be added at the vent opening as opposed to known twin screw extruder constructions. The vent section 32 is identical to the inlet head section 26 in that a region of the left-hand bore adjacent the vent opening may be provided with a smooth surface which prevents material from being passed back out of the vent opening as the upturning screw rotates toward the opening.

In operation, the extruder mechanism 12 receives material through the inlet hopper 22 and moves the material through flow channels defined between the flights of the co-rotating intermeshing screws 46, 48 and through the grooves in the inlet head section. Because the left-hand bore 58 of the inlet head section 26 is provided with a smooth surface region 66 adjacent the inlet opening 62, material travelling through the grooves of the left-hand bore is prevented from passing up along the bore surface and out the inlet opening. However, the material received in the grooves of the remainder of the bore surfaces is transported through the grooves toward the outlet end of the extruder mechanism, thus increasing the capacity of the extruder.

Thereafter, the extrudate is processed in any of a number of possible conventional ways, with material being added at the vent head section, if desired. The extrudate then passes through the conical end head section 38 and out the orifices 52 in the die plate 50 as a finished product.

Although the invention has been described with reference to the preferred embodiment illustrated in the drawing figures, it is noted that substitutions may be made and equivalents employed herein, without departing from the scope of the present invention as recited in the claims.

I claim:

1. In an extruder for processing material to form an extruded product, the extruder including an elongated extruder barrel having material inlet end and an outlet end remote from the inlet end, an inlet opening adjacent the inlet end of the extruder, first and second parallel bores extending axially along the barrel in communication with one another and defining parallel central longitudinal axes, and a pair of elongated, flighted extrusion screws for moving material from the inlet end towards and through the outlet end, the bores each being formed of a first predetermined diameter and the screws being formed of a second predetermined diameter which is substantially equal to the first diameter while being enough smaller than the first diameter to permit movement of the screws relative to the bores, the screws extending through the bores and being rotatable in the same direction as one another relative tot he barrel such that a first one of the screws tends to pull material in a direction downward and outward away from the inlet opening while a second one of the screws tends to pull material in a direction upward and inward toward the inlet opening, wherein the improvement comprising:

each of the bores being provided with at least one continuous helical groove formed in the bore and configured to propel material in the barrel in a direction towards the outlet end, the at least one helical groove extending along the length of the inlet opening and beyond the inlet opening by a predetermined distance, the extruder further comprising flow preventing means for preventing material traveling through the at least one continuous helical groove of the second bore from being passed back out of the inlet opening by the second one of the screws during rotation of the screws, the flow preventing means including a region of the second bore within which the groove is interrupted, the region extending circumferentially at least partially between a horizontal plane that is coplanar with the central longitudinal axes of the bores and the inlet opening, and axially along the length of the inlet opening.

2. The extruder as set forth in claim 1, wherein a line of intersection is defined on the barrel where the two bores intersect one another, a rib being formed between each flight of the spiral grooved surfaces of the bores, each rib of one of the bores being aligned with a groove of the other bore along the line of intersection between the two bores.

3. The extruder as set forth in claim 1, wherein the spiral grooved surfaces of the bores extend along the length of the inlet opening and beyond the inlet opening by a distance at least as great as the diameter of one of the bores.

4. The extruder as set forth in claim 1, wherein the barrel is formed by a plurality of barrel sections, a first of the barrel sections being an inlet section and including the inlet opening, and a second of the barrel sections being connected to the inlet section, the first and second barrel sections being provided with a pair of parallel bores extending axially along the sections, the bores being in communication with one another and being provided with spiral grooved surfaces along the entire lengths thereof.

5. The extruder as set forth in claim 4, further comprising a third barrel section connected to the second barrel section and including a vent opening, and a fourth barrel section connected to the third barrel section, the third and fourth barrel sections being provided with a pair of parallel bores extending axially along the sections, the bores being in communication with one another and being provided with spiral grooved surfaces along the entire lengths thereof.

6. The extruder as set forth in claim 5, wherein at the vent opening, the first one of the screws tends to pull material in a direction downward and outward away from the vent opening while the second one of the screws tends to pull material in a direction upward and inward toward the vent opening, the second bore of the third barrel section being provided with flow preventing means for preventing material traveling through the at least one continuous helical groove of the second bore from being passed back out of the vent opening by the second one of the screws during rotation of the screws, the flow preventing means including a smooth surface region extending circumferentially at least partially between a horizontal plane that is coplanar, with the central longitudinal axes of the bores and the vent opening, and axially along the length of the vent opening.

7. An extruder assembly for processing material to form an extruded product, the assembly comprising:
- a preconditioning assembly for carrying out a preconditioning operation on the processing material, the preconditioning assembly having an inlet and an outlet;
- an elongated extruder barrel having a material inlet end adjacent the outlet of the preconditioning assembly, an outlet end remote from the inlet end, and first and second parallel bores extending axially along the barrel in communication with one another and defining central longitudinal axes;
- an inlet opening adjacent the inlet end of the extruder adapted to permit material from the preconditioning assembly to be fed into the elongated extruder barrel;
- a pair of elongated, flighted extrusion screws for moving material from the inlet towards and through the outlet end, the bores each being formed of a first predetermined diameter and the screws being formed of a second predetermined diameter which is substantially equal to the first predetermined diameter while being enough smaller than the first diameter to permit
- movement of the screws relative to the bores, the screws extending through the bores and being rotatable in the same direction as one another relative to the barrel such that a first one of the screws tends to pull material in a direction downward and outward away from the inlet opening while a second one of the screws tends to pull material in a direction upward and inward toward the inlet opening,
- each of the parallel bores being provided with spiral grooved surfaces along at least a portion of their lengths, the spiral grooved surfaces of the bores extending along the length of the inlet opening and beyond the inlet opening by a predetermined distance, each spiral grooved surface defining at least one continuous helical groove configured to propel material in the barrel in a direction towards the outlet end; and
- flow preventing means for preventing material traveling through the at least one continuous helical groove of the second bore from being passed back out of the inlet opening by the second one of the screws during rotation of the screws.
- the flow preventing means including a region of the second bore within which the groove is interrupted, the region extending circumferentially at least partially between a horizontal plane that is coplanar with the central longitudinal axes of the bores and the inlet opening, and axially along the length of the inlet opening.

* * * * *